(12) United States Patent
Xu et al.

(10) Patent No.: US 7,499,606 B2
(45) Date of Patent: Mar. 3, 2009

(54) METHOD FOR MEASURING MICRO DISPLACEMENTS

(75) Inventors: Zhen-Feng Xu, Beijing (CN); Guo-Fan Jin, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/964,554

(22) Filed: Dec. 26, 2007

(65) Prior Publication Data

US 2008/0159686 A1 Jul. 3, 2008

(30) Foreign Application Priority Data

Dec. 27, 2006 (CN) .................... 2006 1 0157990

(51) Int. Cl.
*G02B 6/00* (2006.01)
(52) U.S. Cl. ............................................. 385/13
(58) Field of Classification Search ........................ None
See application file for complete search history.

(56) References Cited

U.S. PATENT DOCUMENTS 5,353,115 A    10/1994  McIntyre
6,407,815 B2   6/2002  Akihiro
6,724,486 B1   4/2004  Shull et al.
2006/0070823 A1  4/2006  Huang et al.
2006/0103851 A1* 5/2006  Nathan et al. .............. 356/482
2006/0198567 A1* 9/2006  Levy et al. .................... 385/12
2006/0280403 A1* 12/2006 Suh et al. ...................... 385/27

FOREIGN PATENT DOCUMENTS

CN    1851392    10/2006

* cited by examiner

*Primary Examiner*—Michelle R. Connelly-Cushwa
*Assistant Examiner*—Chris Chu
(74) *Attorney, Agent, or Firm*—D. Austin Bonderer (57) ABSTRACT

A method for measuring micro displacements generally includes the steps of: (a) providing a micro displacement sensor with a first photonic crystal module with a number of first crystals, a second photonic crystal module with a number of second crystals, a laser, and a detector; the first crystal module and the second crystal module having a first light guide channel and a second light guide channel therein, respectively; (b) securing the second crystal module onto a sample, the first channel and the second channel being optically coupled together; and (c) during operation, emitting light from the laser, directing such light into the first channel, a first portion of the light exiting from the first channel and a second portion of the light entering the second channel, and analyzing a "light intensity vs. displacement" sine curve to obtain a horizontal micro displacement of the sample.

15 Claims, 6 Drawing Sheets providing a micro displacement sensor with a first photonic crystal module with a number of first crystals, a second photonic crystal module with a number of second crystals, a laser, and a detector; the first crystal module and the second crystal module having a first light guide channel and a second light guide channel therein, respectively;

↓ securing the second crystal module onto a sample, the first channel and the second channel being optically coupled together; and

↓ during sample movement, emitting light from the laser, directing such light into the first channel, a first portion of the light exiting from the first channel and a second portion of the light entering the second channel, and analyzing a "light intensity vs. displacement" sine curve to obtain a horizontal micro displacement of the sample

FIG. 3 providing a micro displacement sensor, the sensor having a first photonic crystal module with a number of first crystals, a second photonic crystal module with a number of second crystals, a third photonic crystal module with a number of third crystals, a laser source, a first detector, and a second detector; the first photonic crystal module, the second photonic crystal module and the third photonic crystal module having a first guide channel, a second light guide channel and a third light guide channel therein respectively;

securing the second photonic crystal module and the third photonic crystal module side by side onto a member, fixing the first photonic crystal module parallel to the second photonic crystal module and the third photonic crystal module, the first light guide channel and the second light guide channel, and the first light guide channel and the third light guide channel are optically aligned; and during operation, emitting light from the laser source, directing such emitted light into the first light guide channel, a first portion of the emitted light exiting from the first light guide channel and a second portion of the emitted light entering the second light guide channel and is detected by the first detector, a third portion of the emitted light entering the third light guide channel and is detected by the second detector via the second detecting opening; plotting changes in intensity of the light received by the first detector and by the second detector respectively to form a sine curve and a cosine curve; analyzing the "light intensity vs. displacement" sine curve and cosine curve to obtain a horizontal micro displacement and a direction of the micro displacement of the first member relative to the second member.

METHOD FOR MEASURING MICRO DISPLACEMENTS

BACKGROUND

1. Field of the Invention

The present invention relates to a method for measuring micro displacements, particularly, to a method for measuring micro displacements adopting photonic crystals as sensors.

2. Description of Related Art

In precision machinery, such as a Micro-Electro-Mechanical Systems (MEMS), relative displacement between parts need to be precisely measured.

Since photonic crystals have a unique effect of a photonic bandgap, micro displacement sensors based on photonic crystals are widely used in the measurement of micro displacements, e.g., measurement sensitivity of the high sensitivity displacement sensor based on photonic crystal waveguide, can be higher than $1.6a^{-1}$ within the measurement range from 0 to 1.5a ("a" is a lattice constant of the photonic crystal); the sensors, based on the photon tunneling effect and Fano interference, can achieve transmittance contrast of 20 dB when the relative displacement changes 1% of optical wavelength, and the micro-displacement sensor, based on the defect resonance cavity of photonic crystal, can achieve a measurement sensitivity of $1.15a^{-1}$ within the measurement range from –0.55a to 0.60a.

However, during the process of the above-mentioned micro-displacement measurement, it is difficult to have a greater dynamic range, due to the small measurable displacement range of micro-displacement sensors, and thereby, the micro-displacement sensors cannot usually measure displacement over two lattice constants.

What is needed, therefore, is a method for measuring micro displacements, adopting a photonic crystal as a micro-displacement sensor, with a large dynamic range and with an ability to measure displacement over two lattice constants.

SUMMARY

In one embodiment, a method for measuring micro displacements generally includes the steps of: (a) providing a micro displacement sensor with a first photonic crystal module with a number of first crystals, a second photonic crystal module with a number of second crystals, a laser, and a detector; the first crystal module and the second crystal module having a first light guide channel and a second light guide channel therein, respectively; (b) securing the second crystal module onto a sample, the first channel and the second channel being optically coupled together; and (c) during operation, emitting light from the laser, directing such light into the first channel, a first portion of the light exiting from the first channel and a second portion of the light entering the second channel, and analyzing a "light intensity vs. displacement" sine curve to obtain a horizontal micro displacement of the sample.

Other advantages and novel features will become more apparent from the following detailed description of the present method for measuring micro displacements, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present method for measuring micro displacements. Moreover, in the drawings, like reference numerals designate corresponding parts throughout the several views.

DETAILED DESCRIPTION OF PREFERRED EMBODIMENTS

Reference will now be made to the drawings to describe, in detail, embodiments of the present method for measuring micro displacements.

Figure 1:
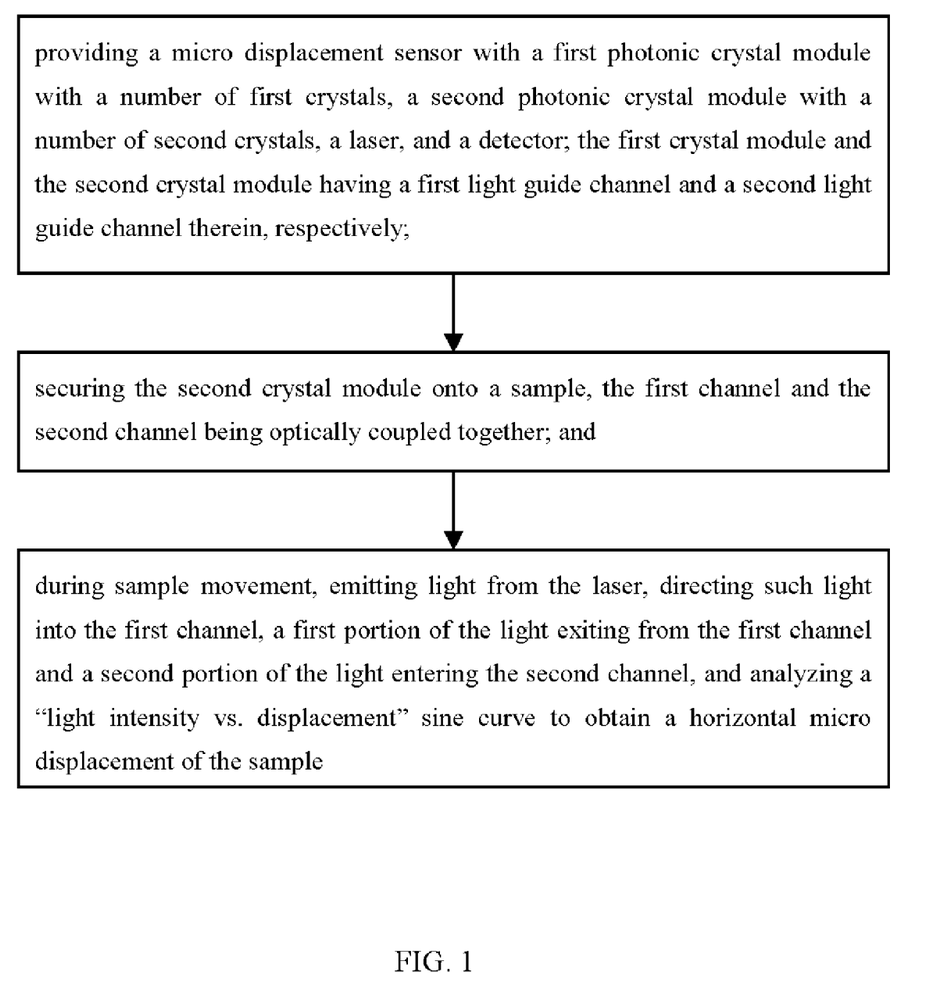
FIG. 1 is a flow chart of a method for measuring micro displacements, in accordance with a first embodiment.

Referring to FIG. 1, a method for measuring micro displacements in accordance with a first embodiment generally includes the steps of: (a) providing a micro displacement sensor, the sensor including a first photonic crystal module with a number of first crystals arranged in a first matrix and including a second photonic crystal module with a number of second crystals arranged in a second matrix, a laser source, and a detector, the first crystals and the second crystals having a same lattice constant "a", the first matrix having a first light guide channel therein, the first light guide channel having a light exit and a light entrance, the second matrix having a second light guide channel therein, the second light guide channel having a detecting opening, the laser source being disposed at the light entrance of the first light guide channel, and the detector being located at the detecting opening of the second light guide channel; (b) securing the second photonic crystal module onto a first member of a device to be measured by a securing means (e.g., adhesive tape), fixing the first photonic crystal module parallel to the second photonic crystal module on another member of the same device or on an unmovable second member with the another member of the same device or the unmovable second member being configured for measuring a relative micro-displacement, and ensuring that the first matrix is aligned with the second matrix and that the first light guide channel and the second light guide channel are optically aligned to provide a path for light from the first light guide channel to enter the second light guide channel; and (c) during operation, emitting light from the laser source, directing such emitted light into the first light guide channel, a first portion of the emitted light exiting from the first light guide channel and a second portion of the emitted light entering the second light guide channel; plotting changes in intensity of the light received by the detector to form a sine curve; analyzing the sine curve of the light intensity as a function of displacement to obtain a horizontal micro displacement of the first member relative to the second member.

Figure 2:
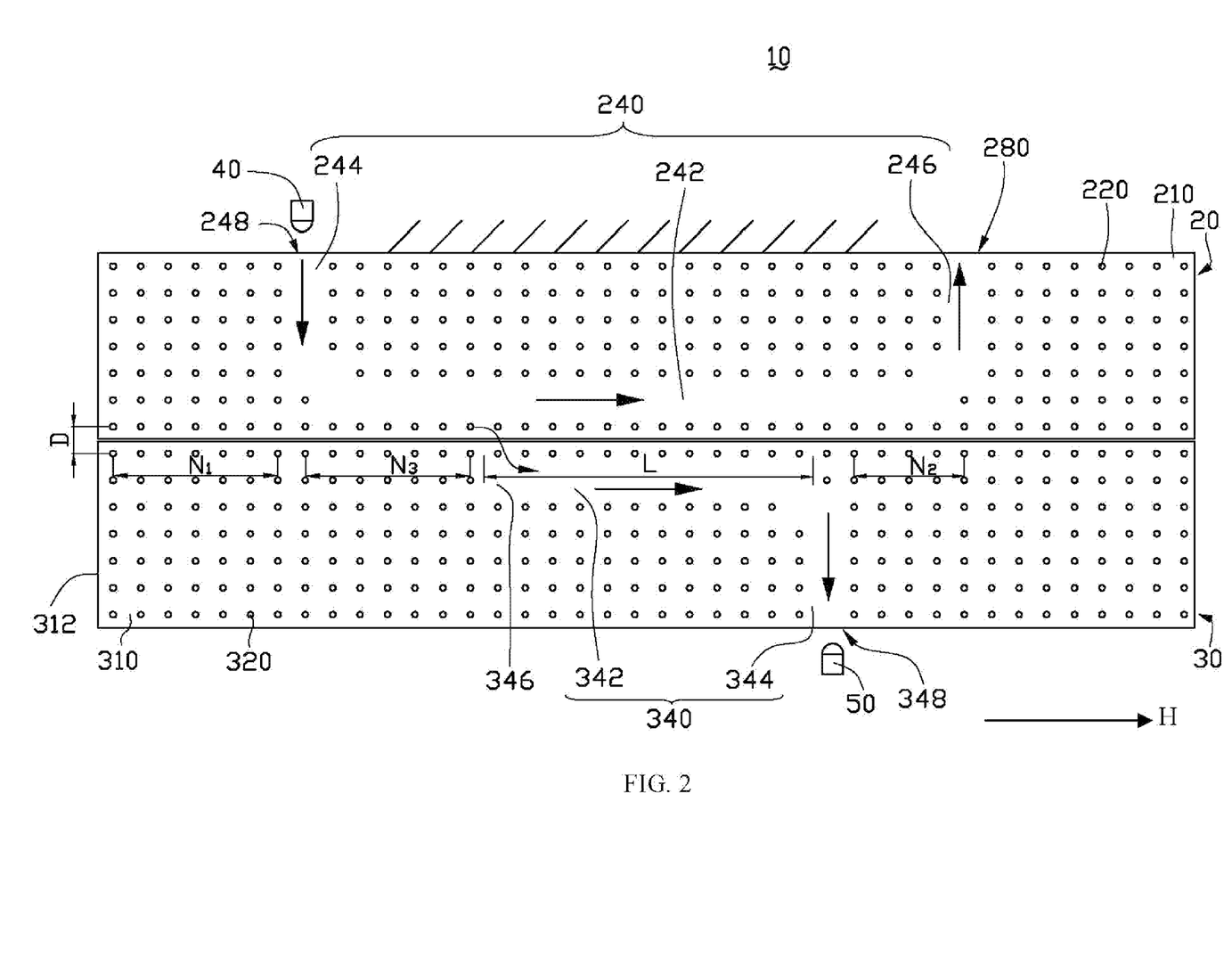
FIG. 2 is a schematic view of a micro displacement sensor used in the method of FIG. 1.

In step (a), referring to FIG. 2, the micro displacement sensor 10 includes a first photonic crystal module 20, a second photonic crystal module 30, a laser source 40, and a detector 50, according to the first present embodiment. The first photonic crystal module 20 includes a first substrate 210 and a number of the first crystals arranged in a first matrix 220. The first matrix 220 has a generally U-shaped first light guide channel 240 defined therein via omission of a number of first crystals from the matrix 220. The first light guide channel 240 includes one first horizontal channel 242 and two first vertical channels 244, 246. The two first vertical channels 244, 246 are perpendicularly connected to the two ends of the first horizontal channel 242, respectively. A light entrance 248 of the first light guide channel 240 is formed at the distal end of the first vertical channel 244. A light exit 280 of the first light guide channel 240 is formed at the distal end of the other first vertical channel 246. The laser source 40 is disposed at (in particular, adjacent to and directed toward) the light entrance 248.

The second photonic crystal module 30 includes a second substrate 310, with a number of second crystals arranged in a second matrix 320 therein along a vertical direction. The second matrix 320 has a second light guide channel 340 defined therein via omission of a number of second crystals from the matrix 320, in a form of "⊓"(i.e., square or rectangle) fractal distribution. The second light guide channel 340 includes a second horizontal channel 342 and a second vertical channel 344. The second horizontal channel 342 is parallel to the first horizontal channel 242, and the second horizontal channel 342 and the first horizontal channel 242 are formed with a row of the first crystals of the first matrix 220 and a row of the second crystals of the second matrix 320 disposed therebetween. A length of the second horizontal channel 342 is in an approximate range from 10a to 30a. A light permeance opening 346 (i.e., an area where light will pass through) is formed at the distal end of the second horizontal channel 342. The second vertical channel 344 is perpendicularly connected to the other end of the second horizontal channel 342. A detecting opening is formed at the distal end of the second vertical channel 344. Advantageously, the detector 50 is an optical fiber detector (i.e., a detector employing an optical fiber).

The first substrate 210 of the first photonic crystal module 20 and the second substrate 310 of the second photonic crystal module 30 are both made of insulative material or semiconductor material, e.g., silicon, silicon dioxide. The first matrix 220 has a same lattice constant "a" as the second matrix 320, and the "a" is a distance between centers of two adjacent crystals. The lattice constant "a" is in an approximate range from 100 nanometers to 100 micrometers. A respective diameter of the first crystal and the second crystal is in an approximate range from 0.3a to 0.7a.

In step (b), a distance between centers of the first crystals of the first matrix 220 and centers of the second crystals of the second matrix 320 in the adjacent row is named D, as can be seen in FIG. 2, and D is in an approximate range from 0.7a to 1.1a. In FIG. 2, the direction H of the parallel adjacent sides of the first matrix and the second matrix is considered to be horizontal. The horizontal distance between the centerline of the column of second crystals bounding/bordering the right side of the second vertical channel 344 of the second light guide channel 340 and the center line of the first vertical channel 246 (i.e., the channel associated with the light exit 280 of the first light guide channel 240) is named $N_2$. The distance between the centerline of the leftmost column of second crystals of the second matrix and the centerline of the column of first crystals bounding/bordering the left side of the first vertical channel 244 (i.e., the channel associated with the light entrance 248) is named $N_1$. The horizontal distance between the centerline of the first vertical channel 244 (corresponding with light entrance 248) and the centerline of the column of second crystals bounding/bordering the left side of the light permeance opening 346 (corresponding with the second light guide channel 340) is named $N_3$.

Figure 3:
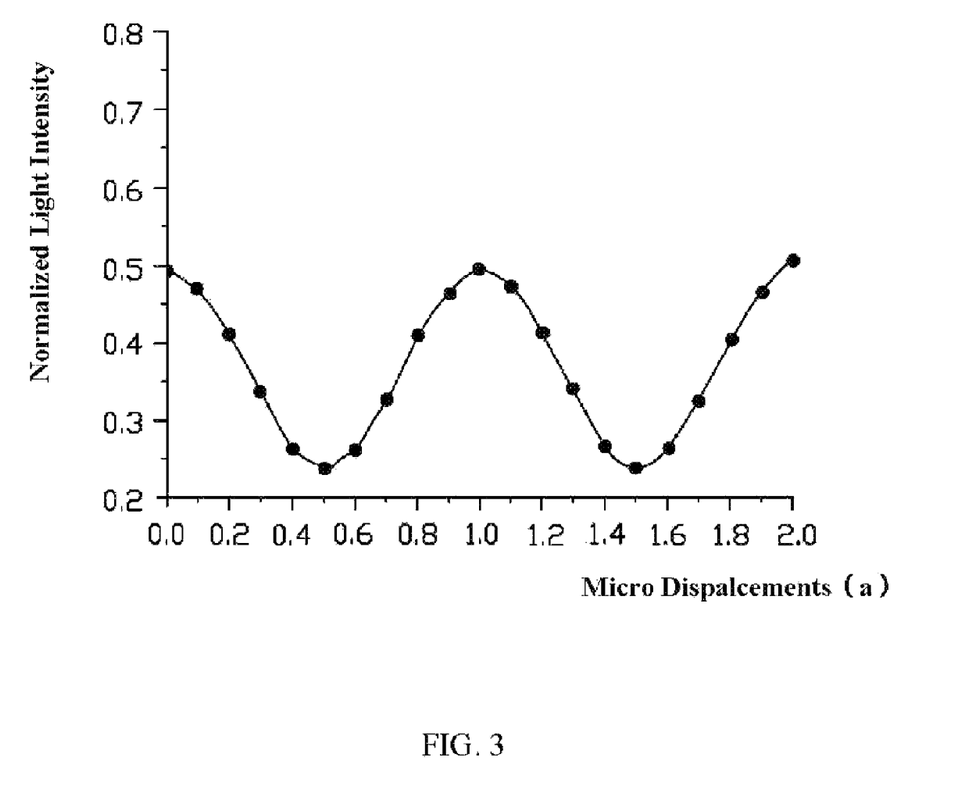
FIG. 3 is a sine curve of light intensity as a function of displacement acquired via the measurement of micro displacement using the micro displacement sensor of FIG. 2 and the method of FIG. 1.

In step (c), during measurement, any horizontal movement of the first member relative to the second member results in changing values of $N_{1-3}$. Changing values of $N_{1-3}$ result in changing values of the intensity of the light received by the detector 50. Plotting changing values of light intensity over time yields a sine curve. That sine curve can be analyzed to find measures of horizontal displacement of the first member relative to the second member. Resolution of the method for measuring the micro displacements is less than 0.01a. As can be seen in FIG. 2, it is apparent that the maximum measurement of the method is the minimum of $N_1+N_3$ and $N_2+N_3$. The measurement range of the micro displacements sensor, in accordance with the first present embodiment, can be several tens of "a" via adjusting the $N_1$, $N_2$ and $N_3$.

Figure 4:
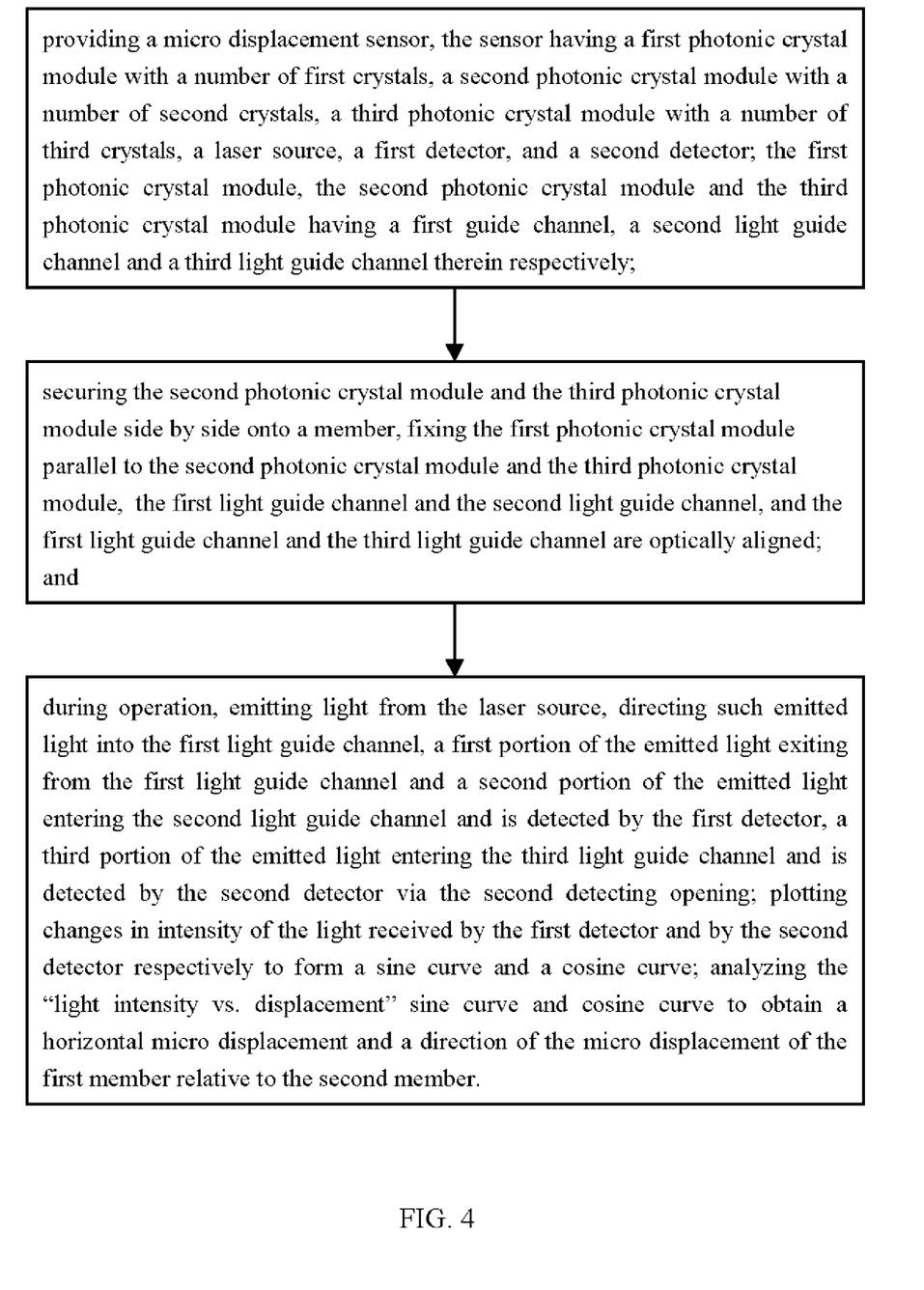
FIG. 4 is a flow chart of a method for measuring micro displacements, in accordance with a second embodiment.

Referring to FIG. 4, a method for measuring micro displacements, in accordance with a second present embodiment, generally includes the steps of: (a) providing a micro displacement sensor, the sensor having a first photonic crystal module, a second photonic crystal module, a third photonic crystal module, a laser source, a first detector, and a second detector, the first photonic crystal module having a number of first crystals arranged in a first matrix, the first matrix having a first light guide channel therein, the first light guide channel having two light exits and one light entrance between the two light exits, the second photonic crystal module having a number of second crystals arranged in a second matrix, the second matrix having a second light guide channel, the second light guide channel having a first detecting opening, the third photonic crystal module having a number of third crystals arranged in a third matrix, the third matrix including a third light guide channel, the third light guide channel having a second detecting opening, the first matrix, the second matrix, and the third matrix having a same lattice constant "a", the laser source being disposed at the light entrance, the first detector and the second detector being arranged on the first detecting opening and the second detecting opening respectively; (b) securing the second photonic crystal module and the third photonic crystal module side by side onto a first member of a device to be measured by a securing means (such as with an adhesive tape), fixing the first photonic crystal module parallel to the second photonic crystal module and the third photonic crystal module on another member of the same device or on an unmovable second member with the another member of the same device or the unmovable second member being configured for measuring a relative micro-displacement, and ensuring that the first crystals is aligned the second crystals, the third crystals is interlaced (not aligned) with the first crystals and the horizontal distance between the centers of the third crystals of the third matrix and the corresponding centers of the first crystals of the first matrix being odd number times of 0.25a, and that the first light guide channel and the second light guide channel, the first light guide channel and the third light guide channel are optically aligned to provide a path for light from the first light guide channel to enter the second light guide channel and the third light guide channel; and (c) during operation, emitting light from the laser source, directing such emitted light into the first light guide channel, a first portion of the emitted light exiting from the first light exit and the second light exit of the first light guide channel and a second portion of the emitted light entering the second light guide channel via the first and second crystals at the junction of the first and second light guide channels and is detected by the first detector via the first detecting opening, a third portion of the emitted light entering the third light guide channel via the first and third crystals at the junction of the first and third light guide channels and is detected by the second detector via the second detecting opening; plotting changes in intensity of the light received by the first detector to form a sine curve and plotting changes in intensity of the light received by the second detector to form a cosine curve; analyzing the sine curve and the cosine curve of the light intensity as a function of displacement to obtain a horizontal micro displacement and a direction of the micro displacement of the first member relative to the second member.

Figure 5:
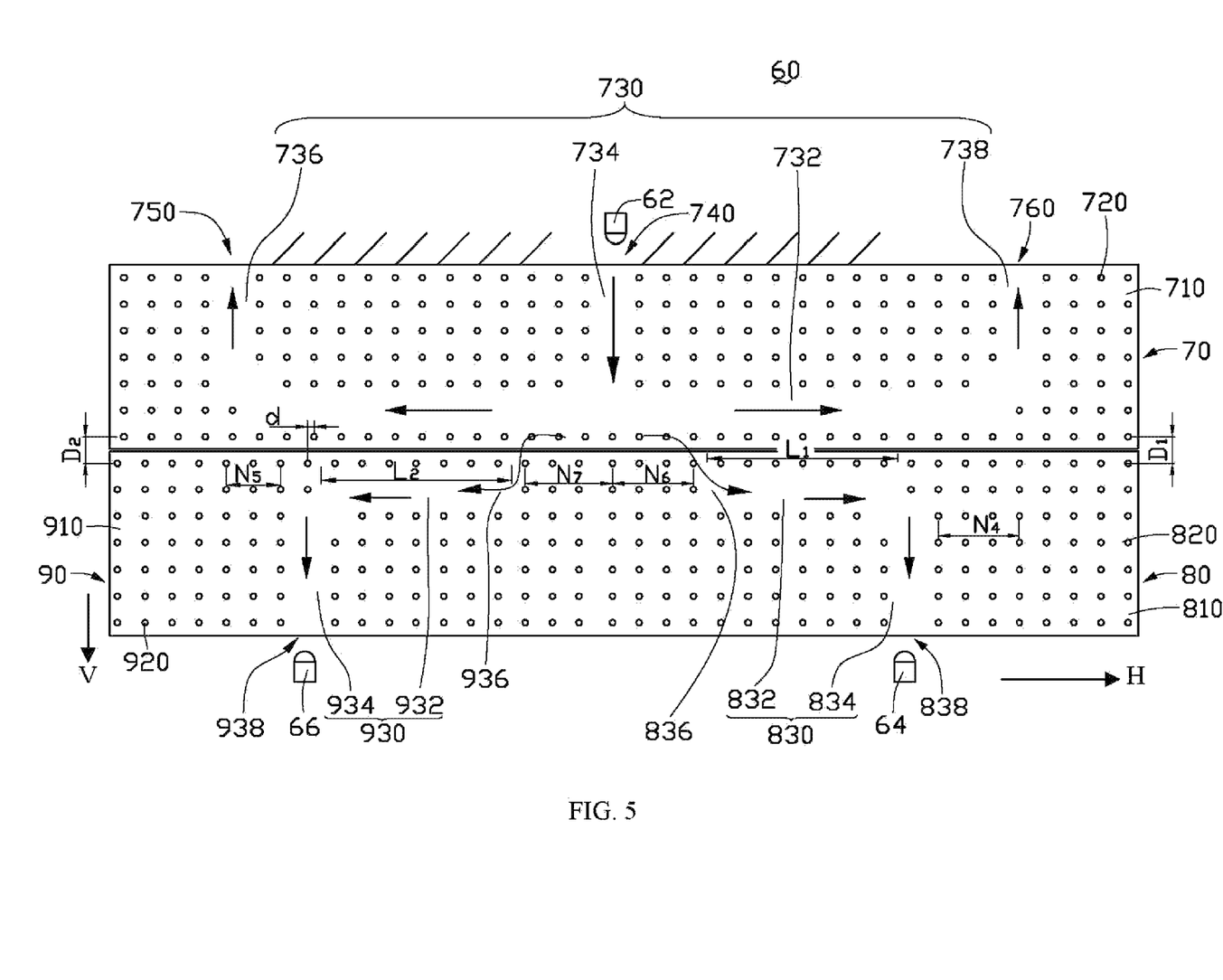
FIG. 5 is a schematic view of a micro displacement sensor used in the method of FIG. 4.

Referring to FIG. 5, the micro displacement sensor 60 includes a first photonic crystal module 70, a second photonic crystal module 80, a third photonic crystal module 90, a laser source 62, a first detector 64 and a second detector 66, according to the second present embodiment. The first photonic crystal module 70 includes a first substrate 71 0, with a number of first crystals arranged in a first matrix 720. The first matrix 720 has a first light guide channel 730 defined via omission of a number of first crystals from the first matrix 720, in a form of a " Ш "fractal distribution. The first light guide channel 730 includes one first horizontal channel 732 and three first vertical channels 734, 736, 738. The central first vertical channel 734 is connected to the middle of the first horizontal channel 732. A light entrance 740 is formed at the distal end of the first vertical channel 734. The laser source 62 is disposed at the light entrance 740. The side two first vertical channels 736, 738 are connected to the two ends of the first horizontal channel 732, respectively. A first light exit 750 and a second light exit 760 are formed at the distal ends of the two first vertical channels 736, 738.

The second photonic crystal module 80 includes a second substrate 810, with a number of second crystals arranged in a second matrix 820 along a vertical direction. The second matrix 820 has a generally L-shaped second light guide channel 830 defined via the omission of a number of second crystals from the second matrix 820. The second light guide channel 830 includes a second horizontal channel 832 and a second vertical channel 834. A length of the second horizontal channel 832 is in an approximate range from 10a to 30a. A first light permeable opening 836 is formed at the end of the second horizontal channel 832 adjacent to the laser source 62. The second vertical channel 834 is connected to the other end of the second horizontal channel 832. A first detecting opening 838 is formed at the distal end of the second vertical channels 834. The first detector 64 is disposed at the first detecting opening 838 and is, relatively, secured with the first detector opening 838.

The third photonic crystal module 90 includes a third substrate 910. The third substrate 910 is combined with the second substrate 810 of the second photonic crystal module or alternatively the third substrate 910 and the second substrate 810 are arranged side by side at a certain distance. A number of third crystals are arranged in a third matrix 920 along a vertical direction V. The third matrix has a generally L-shaped third light guide channel 930 defined via omission of a number of third crystals in the third matrix 920 fractal distribution. The third light guide channel 930 includes a third horizontal channel 932 and a third vertical channel 934. A length of the third horizontal channel 932 is, beneficially, 10a~30a. A second light permeance opening 936 (an area where light will pass through) is formed at the distal end of the third horizontal channel 932, adjacent to the laser source 62. The third vertical channel 934 is connected to the other end of the third horizontal channel 932. A second detecting opening 938 is formed on the distal end of the third vertical channel 934. The second detector 66 is disposed at the second detecting opening 938 and is, relatively, secured with the second detecting opening 938. Advantageously, the first detector 64 and the second detector 66 are optical fiber detectors.

The first substrate 710, the second substrate 810 and the third substrate 910 are all made of an insulative material or semiconductor material, such as silicon or silicon dioxide. The first matrix 720, the second matrix 820, and the third matrix 920 all have a same lattice constant "a", and the "a" is a distance between centers of two adjacent crystals. The lattice constant "a" is in an approximate range from 100 nanometers to 100 micrometers. A respective diameter of the first crystals of the first matrix, the second crystals of the second matrix and the third crystals of the third matrix is in an approximate range from 0.3a to 0.7a.

In step (b), the second horizontal channel 832 is parallel to the first horizontal channel 732 and the second horizontal channel 832 and the first horizontal channel 732 are formed with a row of first crystals of the first matrix 720 and a row of the second crystals of the matrix 820 disposed therebetween. In FIG. 5, a distance between centers of the first crystals of the first matrix 720 and centers of the second crystals of the second matrix 820 in the adjacent row is named $D_1$. The directions of the parallel adjacent sides of the first matrix 720 and the second matrix 820 and the first matrix 720 and the third matrix 920 are considered to be horizontal (i.e., horizontal direction H). The third horizontal channel 932 is parallel to the first horizontal channel 732 and the third horizontal channel 832 and the first horizontal channel 732 are formed with a row of first crystals of the first matrix 720 and a row of third crystals of the third matrix 920 disposed therebetween. A horizontal distance between centers of the third crystals and the corresponding row of the first crystals is, beneficially, 0.25a. A distance between centers of the first crystals of the first matrix 720 and centers of the third crystals of the third matrix 920 in the adjacent row is named $D_2$. $D_1$ and $D_2$ are both, respectively, in an approximate range from 0.7a to 1.1a. A horizontal distance between the centerline of the column of second crystals bounding the right side of the second vertical channel 834 of the second light guide channel 830 and the center line of the first vertical channel 738 (corresponding with the second light exit 760 of the first light guide channel 730) is named $N_4$. A distance between the centerline of the first vertical channel 736 of the first light guide channel 730 (associated with the light exit 750) and the centerline of the column of third crystals bounding/bordering the left side of the third vertical channel 934 is named $N_5$. A horizontal distance between the centerline of the first vertical channel 734 (associated with the light entrance 740) and the centerline of the column of second crystals bounding/bordering the left side of the first light permeance opening 836 of the second horizontal channel 832 is named $N_6$. A horizontal distance between the centerline of the first vertical channel 734 (associated with the light entrance 740) and the centerline of the column of third crystals bounding the right side of the second light permeance opening 936 of the third horizontal channel 932 is named $N_7$.

Figure 6:
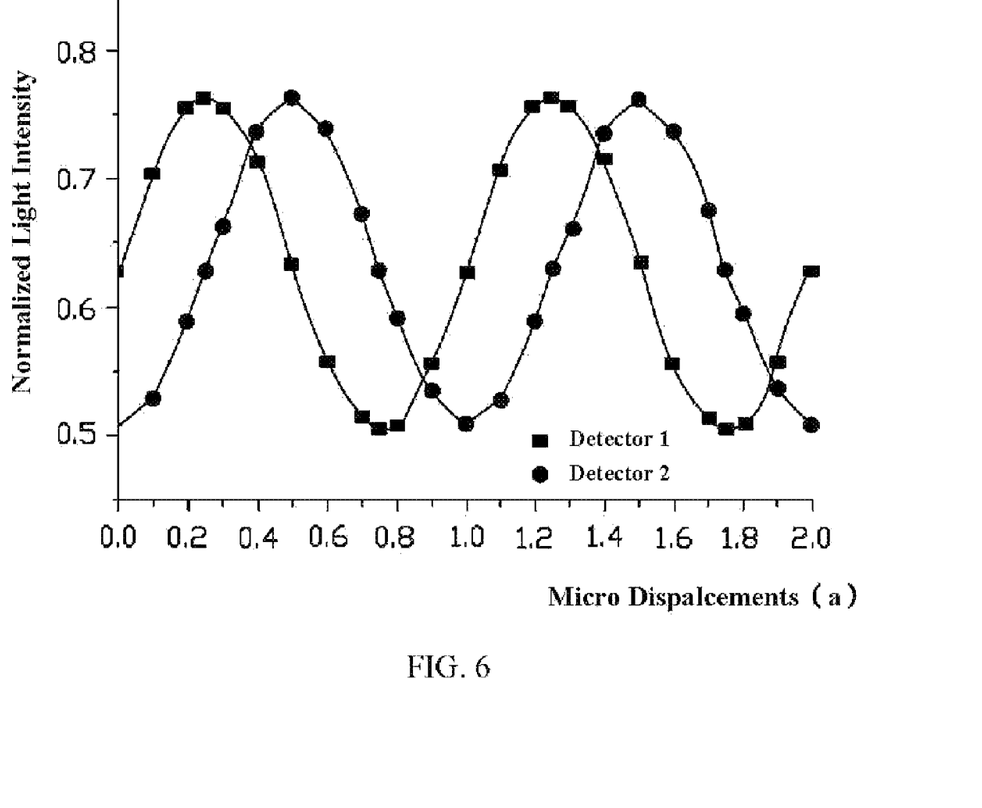
FIG. 6 is a graph of sine and cosine curves of light intensity as a function of displacement acquired via the measurement of micro displacements using the micro displacement sensor of FIG. 5.

In step (c), during measurement, any horizontal movement of the first member relative to the second member results in changing values of $N_{4-7}$. Changing values of $N_{4-7}$ result in changing values of the intensity of the light received by the first detector 64 and the second detector 66. Plotting changing values of light intensity over time, from the first detector 64, yields a sine curve, and plotting changing values of light intensity over time, from the second detector 66, yields a cosine curve. The sine curve and the cosine curve can be analyzed to find measures of horizontal displacement and the direction of the displacement of the first member relative to the second member. Resolution of the method for measuring the micro displacements is less than 0.01a. As can be seen in FIG. 5, it is apparent that the maximum measurement of the method is the minimum of $N_4+N_7$ and $N_5+N_6$. The measurement range of the micro displacements sensor, in accordance with the second present embodiment, can be several tens of "a" via adjusting the $N_4$, $N_5$, $N_6$ and $N_7$.

It is to be understood that the above-described embodiments are intended to illustrate rather than limit the invention. Variations may be made to the embodiments without departing from the spirit of the invention as claimed. The above-described embodiments are intended to illustrate aspects of the invention but not restrict the scope of the invention.

What is claimed is:

1. A method for measuring micro displacements, comprising:
   (a) providing a micro displacement sensor, the sensor including a first photonic crystal module with a number of first crystals arranged in a first matrix and including a second photonic crystal module with a number of second crystals arranged in a second matrix, a laser source, and a detector, the first crystals and the second crystals having a same lattice constant "a", the first matrix having a first light guide channel therein, the first light guide channel comprising a first horizontal channel, and a light exit and a light entrance, the second matrix having a second light guide channel therein, the second light guide channel comprising a second horizontal channel, and a detecting opening, the first horizontal channel and the second horizontal channel are formed with a row of the first crystal of the first matrix and a row of the second crystals of the second matrix disposed therebetween, the laser source being disposed at the light entrance of the first light guide channel, and the detector being located at the detecting opening of the second light guide channel;
   (b) securing the second photonic crystal module onto a first member of a device to be measured by a securing means, fixing the first photonic crystal module parallel to the second photonic crystal module on another member of the same device or on an unmovable second member with the another member of the same device or the unmovable second member being configured for measuring a relative micro-displacement, and ensuring that the first matrix is aligned with the second matrix and that the first light guide channel and the second light guide channel are optically aligned to provide a path for light from the first light guide channel to enter the second light guide channel; and
   (c) during operation, emitting light from the laser source, directing such emitted light into the first light guide channel, a first portion of the emitted light exiting from the first light guide channel and a second portion of the emitted light entering the second light guide channel; plotting changes in intensity of the light received by the detector to form a sine curve; analyzing the sine curve of the light intensity as a function of displacement to obtain a horizontal micro displacement of the first member relative to the second member.

2. The method as claimed in claim 1, wherein a lattice constant "a" of to first matrix and the second matrix is in an approximate range from 100 nanometers to 100 micrometers.

3. The method as claimed in claim 2, wherein a diameter of the first crystals in the row of the first matrix and a diameter of the second crystals in the row of the second matrix are both in an approximate range from 0.3a to 0.7a.

4. The method as claimed in claim 2, wherein a distance between centers of the first crystals of the first matrix and centers of the second crystals of the second matrix in the adjacent row located between the first horizontal channel and the second horizontal channel is in an approximate range from 0.7a to 1.1a.

5. The method as claimed in claim 1, wherein a length of the second horizontal channel is in an approximate range from 10a to 30a.

6. The method as claimed in claim 1, wherein the detector is an optical fiber detector.

7. The method as claimed in claim 1, wherein the first photonic crystal module comprises a first substrate, the second photonic crystal module comprises a second substrate, and the first substrate and the second substrate are both respectively made of an insulative material or a semiconductor material.

8. A method for measuring micro displacements, comprising:
   (a) providing a micro displacement sensor, the sensor having a first photonic crystal module, a second photonic crystal module, a third photonic crystal module, a laser source, a first detector, and a second detector, the first photonic crystal module having a number of first crystals arranged in a first matrix, the first matrix having a first light guide channel therein, the first light guide channel having two light exits and one light entrance between the two light exits, the second photonic crystal module having a number of second crystals arranged in a second matrix, the second matrix having a second light guide channel, the second light guide channel having a first detecting opening, the third photonic crystal module having a number of third crystals arranged in a third matrix, the third matrix including a third light guide channel, the third light guide channel having a second detecting opening, the first matrix, the second matrix, and the third matrix having a same lattice constant "a", the laser source being disposed at the light entrance, the first detector and the second detector being arranged on the first detecting opening and the second detecting opening respectively;
   (b) securing the second photonic crystal module and the third photonic crystal module side by side onto a first member of a device to be measured by a securing means, fixing the first photonic crystal module parallel to the second photonic crystal module and the third photonic crystal module on another member of the same device or on an unmovable second member with the another member of the same device or the unmovable second member being configured for measuring a relative micro displacement, and ensuring that the first crystals is aligned the second crystals, the third crystals is interlaced (not aligned) with the first crystals and the horizontal distance between the centers of the third crystals of the third matrix and the corresponding centers of the first crystals of the first matrix being odd number times of 0.25a, and that the first light guide channel and the second light guide channel, the first light guide channel and the third light guide channel are optically aligned to provide a path for light from the first light guide channel to enter the second light guide channel and the third light guide channel; and
   (c) during operation, emitting light from the laser source, directing such emitted light into the first light guide channel, a first portion of the emitted light exiting from the first light exit and to second light exit of the first light guide channel and a second portion of the emitted light entering the second light guide channel via the first and second crystals at the junction of the first and second light guide channels and is detected by the first detector via the first detecting opening, a third portion of the emitted light entering the third light guide channel via the first and third crystals at the junction of the first and third light guide channels and is detected by the second detector via the second detecting opening; plotting changes in intensity of the light received by the first detector to form a sine curve and plotting changes in intensity of the light received by the second detector to form a cosine curve; analyzing the sine curve and the cosine curve of the light intensity as a function of displacement to obtain a horizontal micro displacement and a direction of the micro displacement of the first member relative to the second member.

9. The method as claimed in claim 8, wherein the lattice constant "a" is in the approximate range from 100 nanometers to 100 micrometers.

10. The method as claimed in claim 9, wherein a diameter of the first crystals of the first matrix, a diameter of the second crystals of the second matrix, and a diameter of the third crystals of the third matrix are all in an approximate range from 0.3a to 0.7a.

11. The method as claimed in claim 9, wherein the first light guide channel comprises a first horizontal channel, the second light guide channel comprises a second horizontal channel, and the third light guide channel comprises a third horizontal channel, the first horizontal channel and the second horizontal channel are formed with a row of the first crystals of the first matrix and a row of the second crystals of the second matrix disposed therebetween, the first horizontal channel and the third horizontal channel are formed with a row of the first crystals of the first matrix and a row of the third crystals of the third matrix disposed therebetween, and a distance between centers of the first crystals of the first matrix and centers of the second crystals of the second matrix and a distance between centers of the first crystals of the first matrix and centers of the third crystals of the third matrix are both in an approximate range from 0.7a to 1.1a.

12. The method as claimed in claim 11, wherein a length of the second horizontal channel and a length of the third horizontal channel are both in an approximate range from 10a to 30a.

13. The method as claimed in claim 9, wherein the horizontal distance between the centers of the third crystals of the third matrix and the corresponding centers of the first crystals of the first matrix is 0.25a.

14. The method as claimed in claim 8, wherein the first detector and the second detector are both optical fiber detectors.

15. The method as claimed in claim 8, wherein the first photonic crystal module comprises a first substrate, the second photonic crystal module comprises a second substrate, and the third photonic crystal module comprises a third substrate, and the first substrate, the second substrate, and the third substrate are all respectively made of an insulative material or a semiconductor material.

\* \* \* \* \*